United States Patent
Henderson et al.

(10) Patent No.: US 7,425,026 B1
(45) Date of Patent: Sep. 16, 2008

(54) SEISMIC-RESISTANT EQUIPMENT CABINETS AND DOOR LATCHES

(75) Inventors: David H. Henderson, Shirley, MA (US); C. Ilhan Gundogan, Lexington, MA (US); F. William French, Harvard, MA (US); Erik C. Nelson, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 55 days.

(21) Appl. No.: 11/427,140

(22) Filed: Jun. 28, 2006

(51) Int. Cl.
*E05C 19/00* (2006.01)
(52) U.S. Cl. ...................... 292/302; 312/222
(58) Field of Classification Search .............. 292/302, 292/DIG. 40; 70/131, 142; 312/215, 222; 16/255, 277
See application file for complete search history.

(56) References Cited

U.S. PATENT DOCUMENTS

| | | | | |
|---|---|---|---|---|
| 2,100,591 A | * | 11/1937 | Haberstump | 292/302 |
| 4,901,884 A | * | 2/1990 | Kallenbach | 220/839 |
| 5,189,257 A | * | 2/1993 | Borgmeyer et al. | 174/50 |
| 5,875,658 A | * | 3/1999 | Lahtinen et al. | 70/34 |
| 6,746,092 B2 | * | 6/2004 | Leccia et al. | 312/222 |
| 6,755,268 B1 | * | 6/2004 | Polz et al. | 180/69.21 |
| 2004/0132398 A1 | * | 7/2004 | Sharp et al. | 454/184 |

* cited by examiner

*Primary Examiner*—Gary Estremsky
(74) *Attorney, Agent, or Firm*—Guerin & Rodriguez, LLP; Michael A. Rodriguez

(57) ABSTRACT

Described are seismic-resistant equipment cabinets and door latches for enabling a hinged door to remain attached to the cabinet during a seismic event of a particular intensity. The door has a latch disposed along one edge of the door. The latch includes a latch-keeper receptacle and a latching bolt disposed in the latch-keeper receptacle. The latching bolt is slideable between a latched and an unlatched position. The frame has a latch keeper assembly attached to an edge thereof. The latch keeper assembly is positioned to enter the latch-keeper receptacle when the door latches to the frame. The latch keeper assembly includes a protruding member having a tapered edge and a latching-bolt aperture to receive the latching bolt when in the latched position. The tapered edge establishes a close fit by the latch keeper assembly within the latch receptacle to limit relative motion therebetween during a seismic event.

18 Claims, 8 Drawing Sheets

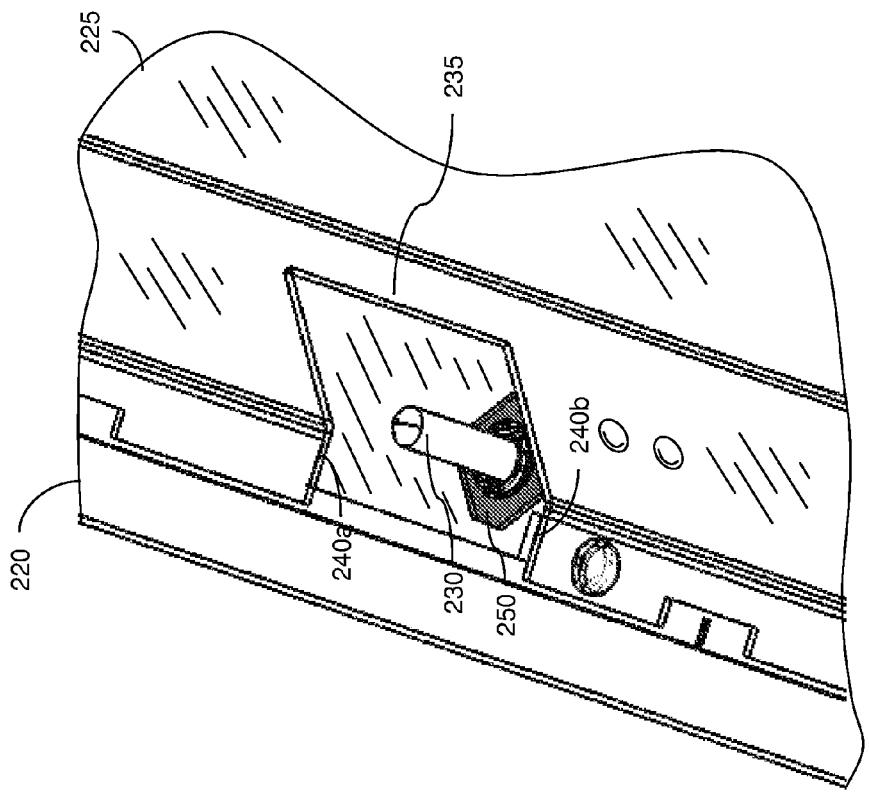
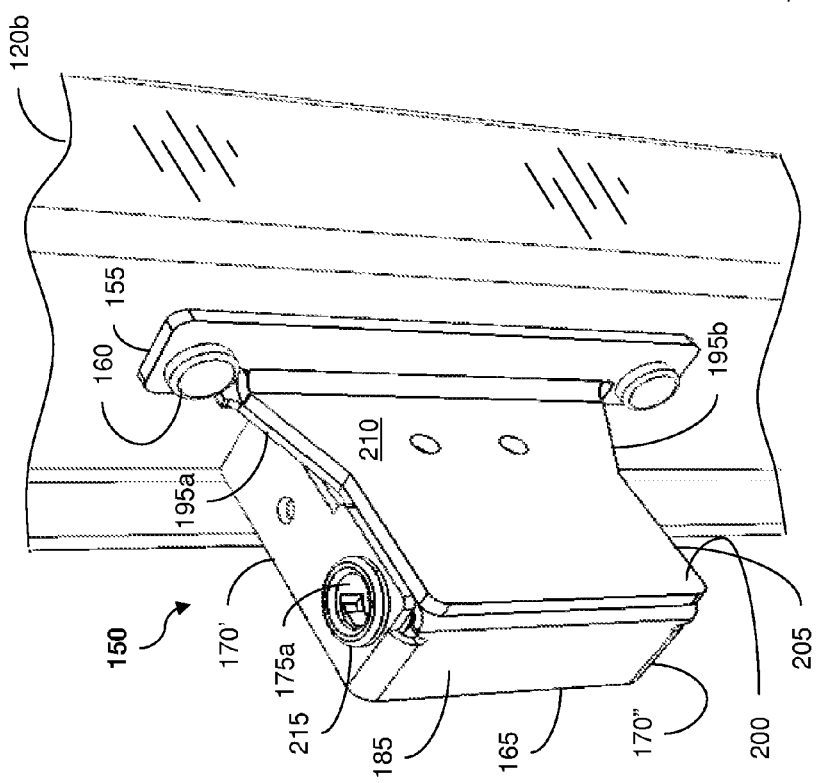
FIG. 4
FIG. 3

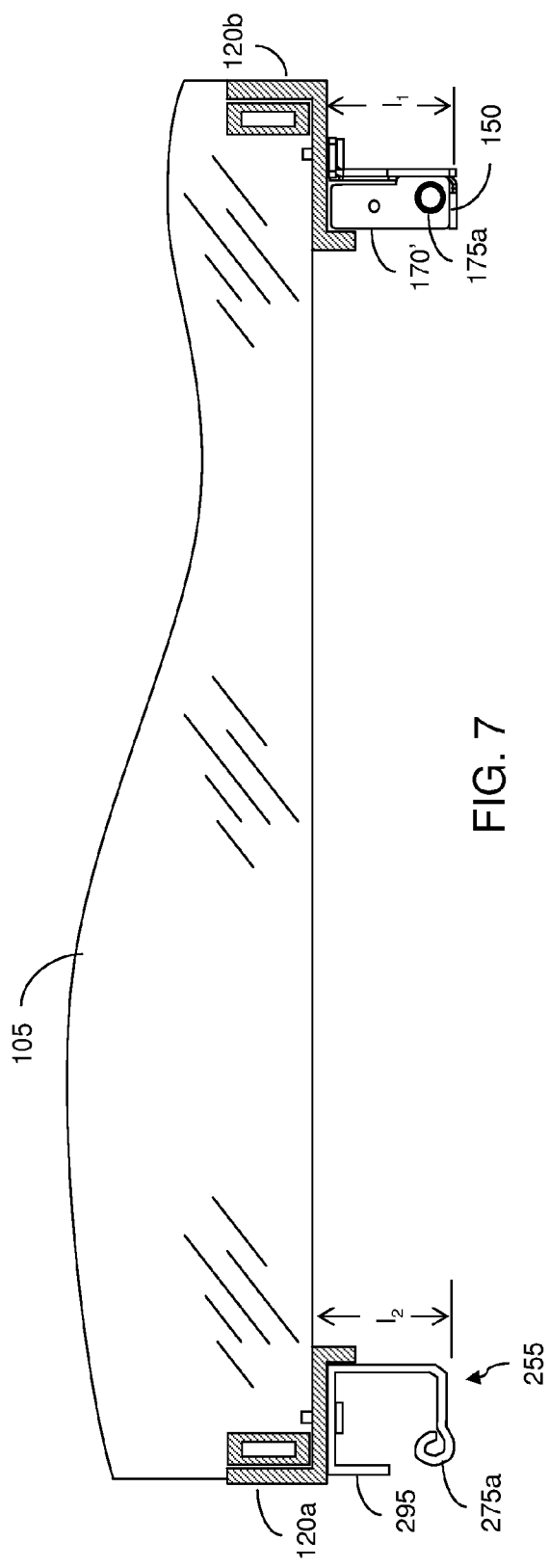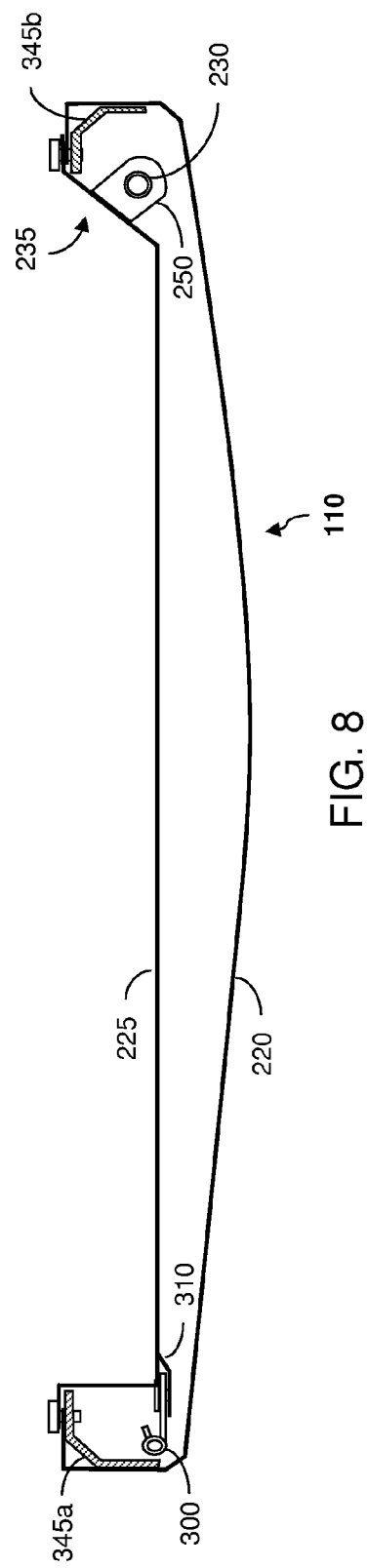

SEISMIC-RESISTANT EQUIPMENT CABINETS AND DOOR LATCHES

FIELD OF THE INVENTION

The present invention relates generally to equipment enclosures. More particularly, the present invention relates to door latches for securing doors to such equipment enclosures.

BACKGROUND

Equipment cabinets are commonly used to store telecommunications and networking equipment found at many sizeable businesses today. Such equipment cabinets are often provided in a tall and narrow configuration, housing equipment stacked vertically to conserve floor space. One such standard cabinet configuration is about 72 inches tall by about 22 inches wide. It is common for these equipment cabinets to include front and rear panel doors to provide a uniform appearance, shield unsightly clutter, protect devices housed therein from environmental hazards, and restrict unauthorized access.

During a seismic event, these equipment cabinets are often subject to violent forces. Such forces can cause the cabinet to move in one or more directions. Tall cabinets are particularly susceptible to lateral movements, as they tend to deform the rack, at least temporarily. The deformation is due at least in part to inertia of heavy equipment located in a top portion of the cabinet.

Lateral movement of the cabinet's base, combined with inertia of top-mounted equipment, produces torque along sidewalls of the cabinet. This torque can cause the rectangular cabinet to sway, resulting in deformation to a non-rectangular, parallelogram. For standard equipment racks that are deeper than they are wide, the deformation is often pronounced along the front and rear sides. Unfortunately, these sides are the ones most often fitted with panel doors.

The equipment cabinet doors are typically attached to the cabinet frame with two or more hinges located along one of the vertical sides. One or more latches are also provided along the opposite vertical side to secure the door in a closed position. Because the doors are typically rigid and often made of steel, they tend to maintain their original shape as the cabinet deforms to a non-rectangular parallelogram. The resulting difference in shapes creates stresses and strains at the points of attachment. Namely, forces are focused at the hinges and the latches, causing one or more of the hinges and latches to fail during the seismic event and the panel door to open or detach from the cabinet altogether.

Such an open or unattached cabinet door, particularly during the seismic event, could lead to injury of nearby personnel and to potential damage to other surrounding equipment. Open or unattached cabinet doors can also pose additional obstacles that may hamper rescue efforts following the seismic event.

The need for designing structurally sound equipment cabinets in view of a seismic event of a predetermined magnitude is recognized. One such standard adopted to qualify testing of equipment cabinets is NEBS GR-63-CORE. Unfortunately, designing equipment cabinets to meet the stringent seismic requirements often leads to added complexity and cost.

SUMMARY

In one aspect, the invention features a seismic-resistant latching system for securing a door to a frame. The latching system includes a latch disposed along one edge of one of the door and the frame. The latch includes a latch-keeper receptacle and a latching bolt disposed in the latch-keeper receptacle. The latching bolt is slideable between a latched and an unlatched position. A latch keeper is attached to an edge of the other of the door and the frame. The latch keeper is positioned to enter the latch-keeper receptacle when the door latches to the frame. The latch keeper includes a protruding member having a tapered edge and a latching-bolt aperture to receive the latching bolt when in the latched position. The tapered edge establishes a close fit by the latch keeper within the latch receptacle to limit relative motion therebetween during a seismic event.

In another aspect, the invention features a seismic latch keeper assembly for securing a door to a frame under seismic load. The door has a latch receptacle and a slideable latch bolt in the latch receptacle operable between latched and unlatched positions. The latch keeper assembly comprises a protruding member having a distal end sized to enter the latch receptacle with a first clearance, a proximal end opposite the distal end, and a bolt-receiving aperture disposed between the proximal and distal ends. A shoulder portion attaches to the protruding member. The shoulder portion has an expanding taper for engaging the latch receptacle with a second clearance less than the first clearance when the protruding member enters the latch receptacle. The second clearance operates to limit relative movement of the protruding member within the latch receptacle during a seismic event. A mounting flange can couple the protruding member to the frame.

In still another aspect, the invention features an electronic enclosure cabinet comprising a door and a frame. The door has a latch disposed along one edge of the door. The latch includes a latch-keeper receptacle and a latching bolt disposed in the latch-keeper receptacle. The latching bolt is slideable between a latched and an unlatched position. The frame has a latch keeper assembly attached to an edge thereof. The latch keeper assembly is positioned to enter the latch-keeper receptacle when the door latches to the frame. The latch keeper assembly includes a protruding member having a tapered edge and a latching-bolt aperture to receive the latching bolt when in the latched position. The tapered edge establishes a close fit by the latch keeper assembly within the latch receptacle to limit relative motion therebetween during a seismic event.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 3 illustrates a perspective cut-away view of one embodiment of an equipment enclosure chassis including a seismic-resistant latch keeper.

FIG. 4 illustrates a perspective cut-away view of one embodiment of an equipment enclosure door including a latching rod adapted to engage the latch keeper of FIG. 3.

FIG. 7 illustrates a cross-sectional top view of a front portion of the equipment enclosure chassis illustrated in FIG. 1.

FIG. 8 illustrates a cross-sectional top view of the equipment enclosure door illustrated in FIG. 1.

DETAILED DESCRIPTION

A seismic-resistant door latch constructed in accordance with the invention enables a hinged door to remain attached to its frame and closed during a seismic event. The hinged door includes one or more hinges disposed along one edge and one or more latches disposed along another edge. A reinforced latch keeper on the cabinet engages a latch channel (or aperture) in the hinged door. The reinforced latch keeper includes an expanding taper that presents a narrowed leading edge to a latch channel when the latch keeper enters the latch channel in order to close the panel door. The latch keeper's narrowed leading edge presents a first clearance to the latch channel; whereas, its wider shoulder presents a second, reduced clearance to the same latch channel. The reduced clearance provided by the expanding taper of the latch keeper to the latch channel inhibits movement therebetween during a seismic event. Such a reduction in movement reduces or eliminates banging of the door's latch channel against the latch keeper, a condition referred to as "jack hammering," that can lead to damage and in some instances unintended disengagement of the latch keeper.

The reinforced and tapered latch keeper is combined with an offset leaf hinge adapted to retain pivotal engagement between the hinged door and the equipment cabinet during a seismic event. Beneficially, the offset leaf hinge provides the hinge pivot with a supporting structure capable of plastic deformation during a seismic event. Thus, relative movement between the hinged door and the equipment cabinet, as might occur from deformation of the equipment cabinet during the seismic event, is substantially absorbed by deformation of the offset hinge member. Although one or more of the hinges may be deformed, perhaps even losing their ability to pivot the door during such an event, the hinges are more easily replaced and at substantially less expense than either the door or the equipment cabinet.

Figure 1:
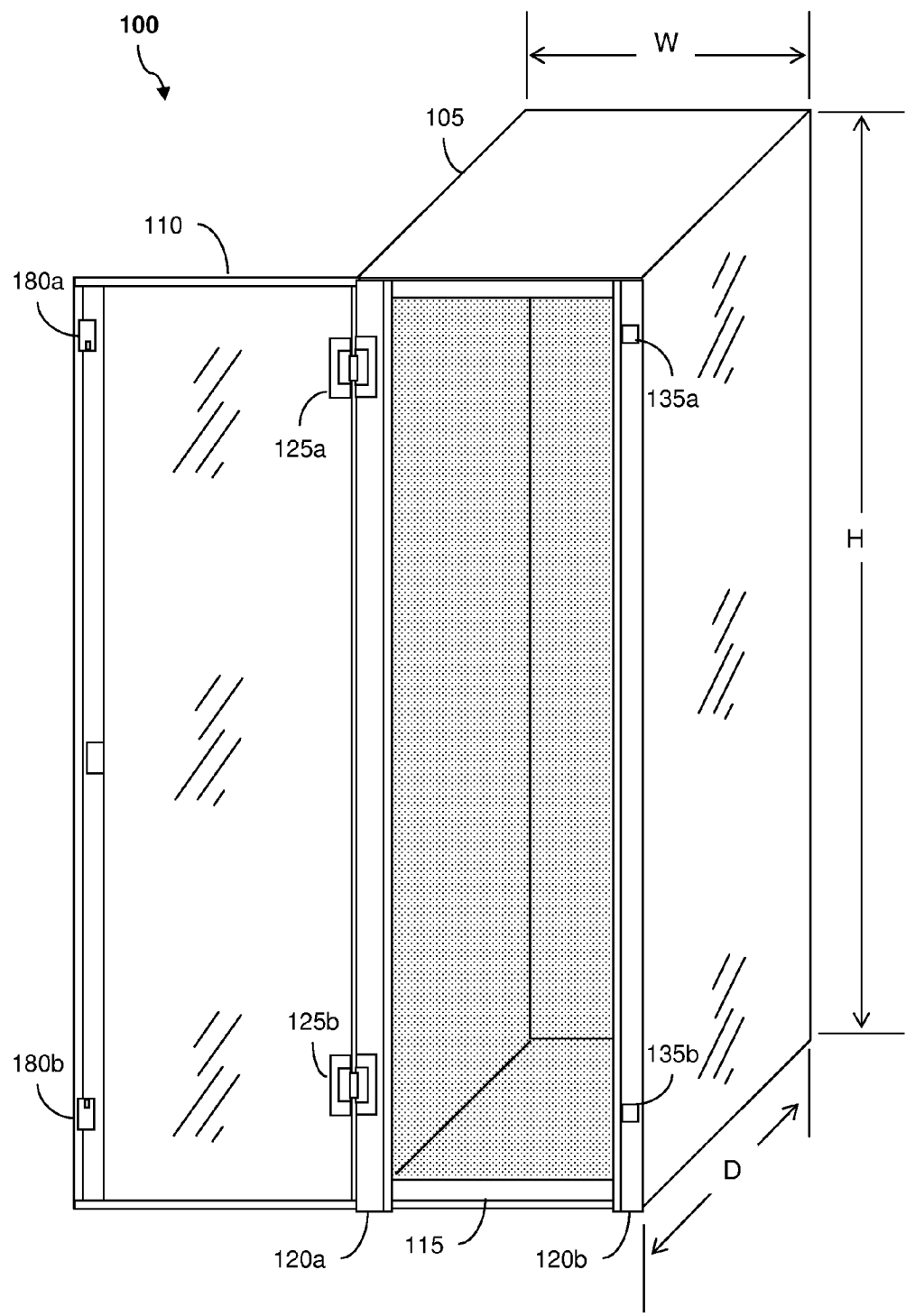
FIG. 1 illustrates an isometric view of one embodiment of an equipment enclosure constructed in accordance with the present invention.

FIG. 1 illustrates an electronic equipment enclosure 100 constructed in accordance with the principles of the present invention. The equipment enclosure 100 is shown as a rectangular configuration including a cabinet 105 for housing electronic equipment therein and a hinged panel door 110 for providing access to the electronic equipment housed therein.

In this illustrative equipment enclosure 100, panel door 110 provides access along a front side 115 of the cabinet 105. In some embodiments, the panel door 110 provides access to a rear side, or to one of the left and right sides of the cabinet 105. In yet other embodiments, the cabinet 105 includes multiple doors on the same or different sides of the cabinet 105, each constructed in accordance with the principles of the present invention.

The enclosure 100 is shown in a vertical configuration in which the height H of the cabinet 105 is greater than its width W. For example, the cabinet 105 has a width of about 22-24 inches to accommodate standard 19-inch rack-mountable electronic devices. The height of the equipment enclosure 100 can be depend upon the size and quantity of equipment to be housed therein. Often, the height of the equipment enclosure 100 is expressed in terms of rack units (RUs), with one RU corresponding to about 1.75 inches. The depth D of the cabinet 105 again depends upon the intended application. For standard types of electronic equipment enclosures, the depth is often greater than the width, as shown.

The cabinet 105 typically includes a structural frame providing support to the cabinet 105 and to the electronic equipment housed therein. Continuing with the illustrative embodiment, the structural frame includes at least two vertical frame segments 120a, 120b disposed along opposite corners of the front side 115 of the cabinet 105. These vertical frame segments 120a, 120b also provide structural support to the panel door 110. As illustrated, the panel door 110 is pivotally coupled along one edge of the vertical left frame segment 120a using at least two hinges 125a, 125b (generally 125). The hinges 125 are coupled between one edge of the panel door 110 and the left vertical frame segment 120a, such that the panel door 110 is allowed to pivot between open and closed positions. As shown, the panel door 110 is mounted in a right-to-left configuration, sometimes referred to as a left-hand reverse door configuration. In other embodiments, the panel door 110 can be mounted in other configurations, such as a left-to-right configuration in which the hinges would be coupled to the right vertical frame segment 120b.

The equipment enclosure 100 also includes a latching mechanism adapted to selectively secure the panel door 110 in a closed position. For example, the latching mechanism includes two latching bolts 180a, 180b (generally 180) coupled to the panel door 110 and corresponding latch keepers 135a, 135b (generally 135) coupled to a right frame member of the equipment cabinet 105. The keepers 135 are aligned with the latching bolts 180 when the panel door 110 is closed.

Figure 2:
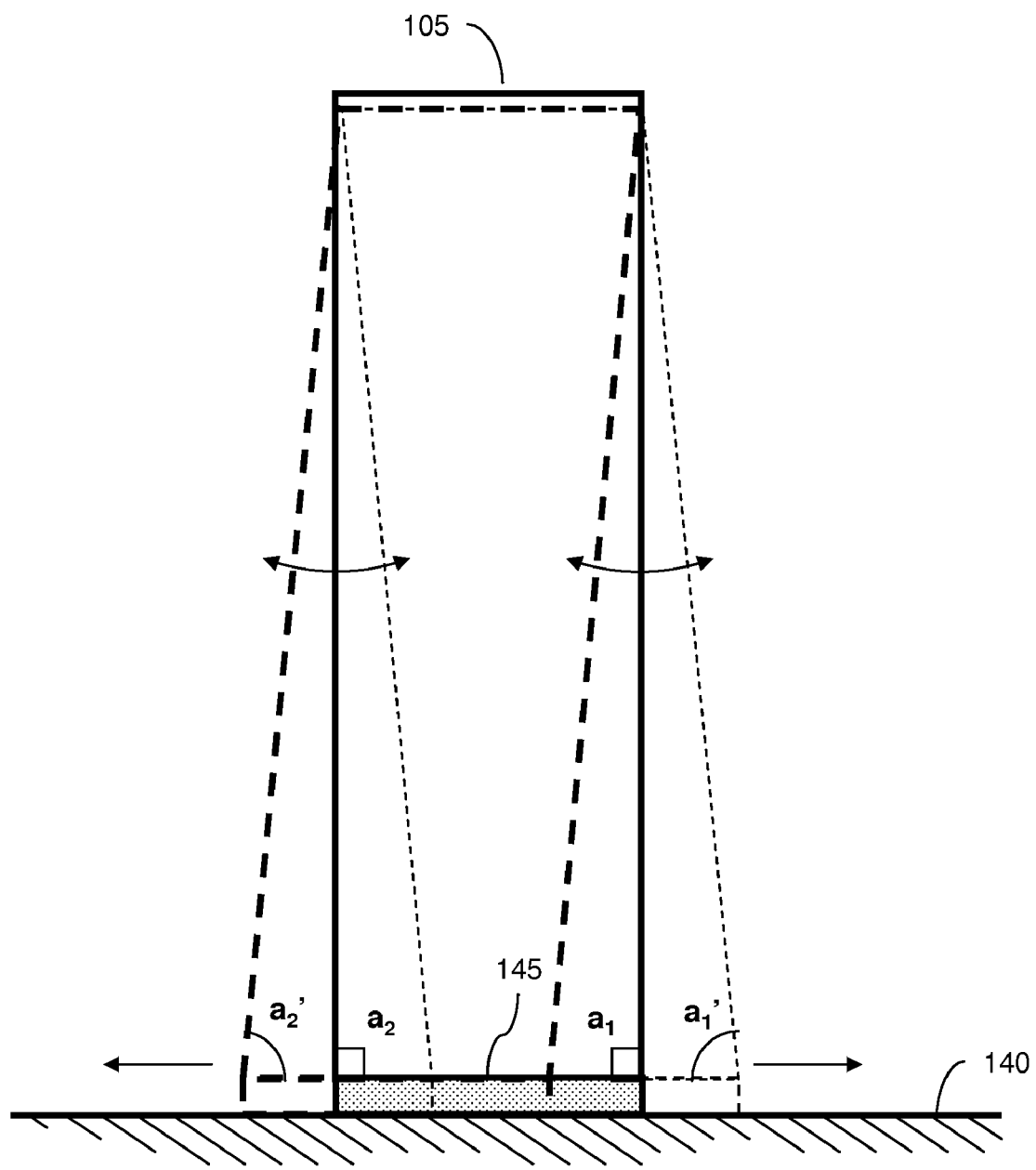
FIG. 2 illustrates a schematic view of equipment enclosure deformation during a seismic event.

FIG. 2 illustrates a schematic view of deformation experienced by a rectangular equipment cabinet 105 during a seismic event. In a seismic event, the ground (e.g., the floor of a building) is subjected to movement in one or more different directions. This movement includes vertical or up-and-down movement and lateral or side-to-side movement. In a general sense, the lateral motion can occur in any direction along the surface of the ground. Often the motion is oscillating, including a back-and-forth component. Illustrated is an example of an oscillating lateral motion in which the floor 140 moves alternately from left to right as shown by the straight arrows adjacent to the bottom of the equipment cabinet 105.

Often, the equipment cabinet 105 is secured to the floor of an equipment room. In some embodiments, the equipment cabinet 105 is bolted to the floor 140 using a mounting bracket 145. Thus, the movement of the floor 140 due to the seismic event will be directly transferred to the bottom of the equipment cabinet 105. Because equipment housed within the cabinet 105 can be of considerable weight, it has an associated inertia that develops torque acting along the vertical structural supports of the equipment cabinet 105.

The resulting torque can cause the equipment cabinet 105 to at least temporarily deform. For example, a rectangular equipment rack can deform to a non-rectangular parallelogram during the seismic event. A seismic force is produced at the bottom of the equipment cabinet 105, caused by the lateral movement of floor 140. This force combines with inertia due to equipment housed in the top portion of the equipment cabinet 105 and provides countering forces along the top of the equipment cabinet 105. These counter-directed forces at opposite ends of the vertical supports result in a torque that can lead to the type of deformation shown. Thus, right angles $a_1$, $a_2$ formed at the interior junction of the vertical side support at the base of the equipment cabinet 105 deform to non-right angles $a_1'$, $a_2'$ during a seismic event.

Further, oscillations can develop along the top of the equipment cabinet 105 as the resting inertia is overcome and the top begins to move to one side, while the bottom of the equipment cabinet 105 is moved to an opposite side. Thus, the equipment cabinet 105 may oscillate back and forth during such lateral movements. A rectangular door fitted to the front of the equipment cabinet 105 may not deform and thus remains generally rectangular throughout the seismic event. Deformation of the rack to a non-rectangular parallelogram will produce forces along any points of attachment to the rectangular door. For example, such forces would be experienced along the hinges 125 and latch keepers 135 (FIG. 1).

FIG. 3 illustrates a perspective cut-away view of one embodiment of an equipment enclosure chassis including a seismic-resistant latch keeper 150. The latch keeper 150 is attached through a mounting flange 155 to one of the vertical frame members 120b of the equipment cabinet 105 (FIG. 1). For example, the mounting flange 155 can be attached using mechanical fasteners, such as screws 160, rivets, or chemical fastening means including welding or chemical bonding. The latch keeper 150 includes a blade or fin 165 that protrudes outward and away from the front face of the vertical frame member 120b. Thus, the fin 165 extends out toward the front of the equipment cabinet 105 to engage the panel door 110 (FIG. 1), when closed. Preferably, the fin 165 is formed from a rigid material, such as a metal. In some embodiments, the fin 165 is formed from 1010 steel having a thickness of about 0.060 inch. Structural strength of the fin 165 serves to bear the forces produced between the equipment cabinet 105 (FIG. 1) and the front panel door 110 (FIG. 1) during a seismic event.

The fin 165 includes at least one horizontal portion 170' with an aperture 175a sized and positioned to accommodate an end portion of the latch pin 180a (FIG. 1). For example, the top latch keeper 135a (FIG. 1) includes a bottom horizontal portion 170" including an aperture 175b sized and positioned to receive an end portion of the top latch pin 180a. Conversely, the bottom latch keeper 135b (FIG. 1) includes a top horizontal portion 170' including an aperture 175a sized and positioned to receive an end portion of the bottom latch pin 180b. Depending upon the linear displacement or "throw" (the distance that the end portion of the latch pin 180 travels between its latched and unlatched positions), the fin 165 can include both top and bottom horizontal portions 170', 170", each defining a respective aperture 175a, 175b. Thus, the end portion of the latch pin 180a can reside simultaneously within both apertures 175a, 175b when in the latched position.

The latch keeper 150 includes a leading end 185 opposite the mounting flange 155 that is sized to fit within a corresponding aperture of the panel door 110 (FIG. 1) when closed. Preferably, the leading end 185 is dimensioned to fit within such a door aperture providing sufficient clearance to avoid interference with the door during opening and closing of the door. Thus, the linear dimensions of the leading end 185 are less than the dimensions of its corresponding door aperture.

Figure 11:
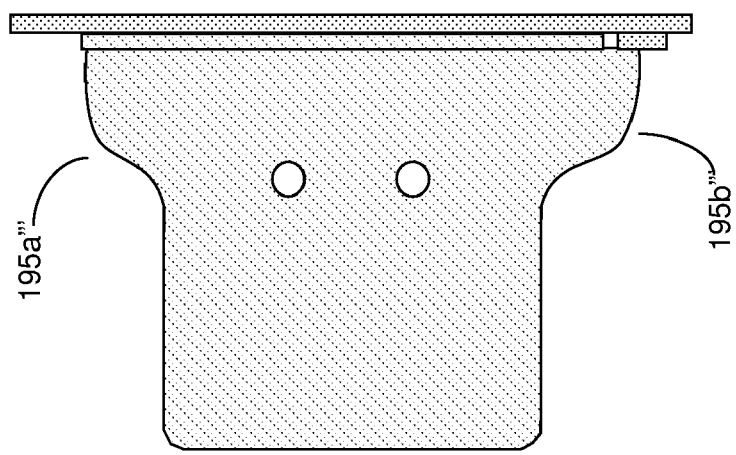
FIG. 11 illustrates a cut-away view of one embodiment of the seismic-resistant latch keeper having a curvilinear tapered edge.

The latch keeper 150 also includes an increasing taper 195 provided along at least a portion of the fin 165. The taper 195 expands in a linear dimension along a profile of the fin 165 from the leading end 185 to the mounting flange 155. In one embodiment, the latch keeper 150 includes a reinforcing plate 200 extending vertically along one side of the fin 165. The reinforcing plate 200 can be formed from the same material as the fin 165. In some embodiments, the reinforcing plate 200 is about 0.100 inch thick. The reinforcing plate 200 includes a neck portion 205 extending from the leading end 185 toward the mounting flange 155. The reinforcing plate 200 also includes a shoulder portion 210 disposed between the neck portion 205 and the mounting flange 155. For example, the shoulder portion 210 includes a top taper 195a and a bottom taper 195b. The tapers 195a, 195b can be symmetric as shown and can take any number of different forms including a linear taper, a piecewise linear taper, a curved taper, a curvilinear taper (FIG. 11), or any combination thereof.

In some embodiments, the aperture 175a is fitted with a bushing insert 215. Thus, the aperture 175a can be oversized, with the bushing insert 215 receiving an end portion of the latch pin 180a. The bushing insert 215 can be formed of a different material than the fin 165. For example, the bushing insert 215 can be formed from a polymer (i.e., a polyolefin or polytetrafluoroethylene (PTFE)) for ease of manufacture and for reducing friction during latching and unlatching.

FIG. 4 illustrates a perspective cut-away view of one embodiment of the panel door 110 formed with an outer panel 220 and an inner panel 225. The outer and inner panels 220, 225 can be formed from a sturdy material, such as steel, to provide protection and structural integrity. In some embodiments, the panels 220, 225 are secured to a frame. For example, the panels 220, 225 may be formed around and secured to a vertical frame (not shown).

Formed along an interior portion of one edge of the panel door 110 is an aperture providing access to an end portion of the latching rod 230. As illustrated, the inner panel 225 includes an aperture or latch channel 235 that can be formed by a cut-out in the edge of the inner panel 225. The latch channel 235 includes a top leading edge 240a and a bottom leading edge 240b along a portion of the perimeter of the latch channel facing the latch keeper, when the panel door 110 is closed. The top and bottom leading edges 175a, 175b are spaced apart, such that the leading end 185 (FIG. 3) of latch keeper 150 (FIG. 3) fits therebetween with sufficient clearance to permit unhindered opening and closing of the panel door 110.

Disposed between the inner and outer panels 225, 220 along an outer edge of the panel door 110 is the latch channel 235. A latching rod end portion 230 is accessible through the latch channel 235. In an unlatched position, the latching rod end portion 230 is substantially recessed between the inner and outer panels 225, 220 providing an unobstructed latching channel 235 and providing clearance to the latch keeper 150 during opening and closing of the panel door 110. After the panel door 110 is closed and the fin portion 165 of the latch keeper 150 resides at least partially within the latch channel 235, the latching rod end portion 230 is translated into the latch channel 235, thereby entering the aperture 175a of the latch fin 165 and latching the panel door 110 in a closed position. The latching rod end portion 230 is slideable within a guide 250 that maintains axial integrity of the end portion 230 throughout the latching and unlatching process. Interference caused by the latching rod end portion 230 and the latch keeper 150 prevents the panel door 110 from being pulled or otherwise forced open.

In some embodiments, the panel door 110 (FIG. 1) is mounted to a cabinet 105 using one or more hinges 125a, 125b (FIG. 1). One family of hinges commonly used includes leaf hinges, similar to those commonly found residential passageway doors. Each leaf hinge typically has at least two hinge components, one fastened to the panel door 110 and the other fastened to the cabinet 105 (FIG. 1). The two hinge components are joined along a common axis, typically by a pin, allowing them to pivot therebetween.

Figure 5:
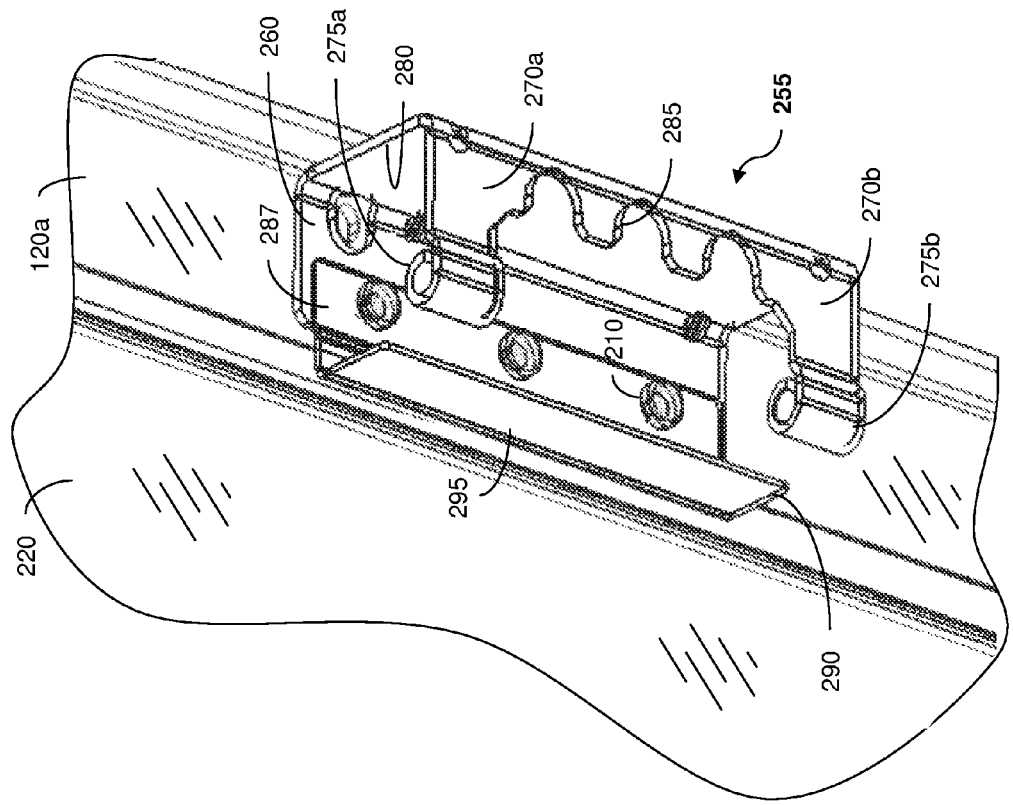
FIG. 5 illustrates a perspective cut-away view of one embodiment of an equipment enclosure chassis including a first leaf hinge component.

Shown in FIG. 5 is a perspective cut-away view of one embodiment of a hinge component 255 mounted to the equipment cabinet 105. More precisely, the hinge component is an offset-frame leaf hinge component 255 in which the pivot point is displaced away from the doorframe.

The offset-frame leaf hinge component 255 includes a frame-leaf mounting bracket 260 adapted to abut an adjacent portion of the left vertical frame member 120a. The frame-leaf mounting bracket 260 can be attached to the vertical frame member 120a using mechanical fasteners, such as screws 265, rivets, or chemical fastening means including welding or chemical bonding. The offset-frame leaf hinge component 255 also includes top and bottom knuckle arms 270a, 270b (generally 270) each including at one end a respective knuckle 275a, 275b (generally 275). The knuckles 275 define apertures therein to accommodate a hinge pin aligned with the hinge's pivot axis. The knuckle arms 275 are each coupled at another end to a pivot-offset member 280. The pivot-offset member 280 provides support to the knuckle arms 270, positioning them in a plane parallel to the left vertical frame member 120a, but displaced away from the frame member 120a. In some embodiments, the pivot offset member is formed from a rigid material, such as 1010 steel. The rigid material can have a thickness of about 0.060 inch.

The frame-leaf mounting bracket 260, the pivot offset member 280, and the knuckle arms 270 can be formed from a single piece of U-channel stock. The knuckles 275 can be formed by rolling an end portion of the knuckle arm 270 over onto itself, creating a cylindrical cavity therein. In some embodiments, the knuckle arms 270 are separated by one or more cutouts 285 that provide clearance for mechanical fasteners of a mating leaf hinge component mounted to the panel door 110. The cutouts 285 avoid interference with such fasteners when the hinge 125 is in a closed position.

In some embodiments, the offset-frame leaf hinge component 255 includes a doorstop bracket 290. The doorstop bracket 290 includes a doorstop surface 295 positioned to interfere with a corresponding surface of the panel door 110 (FIG. 1) when in an open position. For example, the doorstop surface 295 can be formed from an 'L' bracket, as shown, and mounted along one side to the left vertical frame member 120a. Thus, one side of the 'L' bracket defines a doorstop mounting bracket 287 that is placed against the left vertical frame member 120a. The other side of the 'L' bracket extends away from the frame providing the doorstop surface 295. In some embodiments, the doorstop surface 295 can be formed integrally with the offset-frame leaf hinge component 255, or as a separate component as shown. In some embodiments that use a separate doorstop surface 295, the doorstop surface 295 can be attached to the left vertical frame member 120a using the same mechanical fasteners 265 used to secure the offset-frame leaf hinge component 255.

Figure 6:
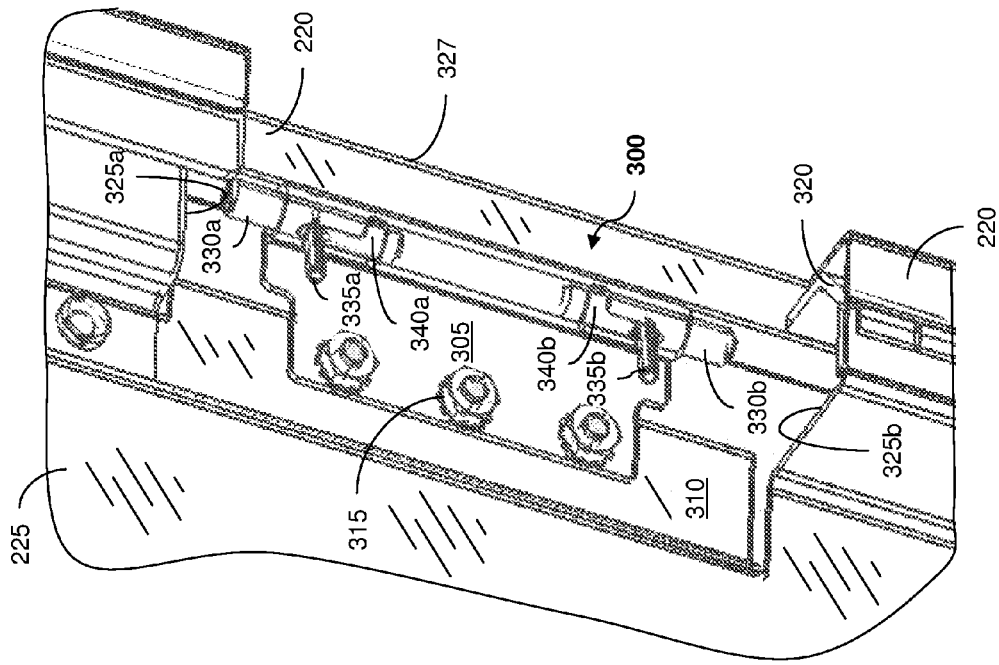
FIG. 6 illustrates a perspective cut-away view of one embodiment of an equipment enclosure door including a second leaf hinge component adapted to engage the first leaf hinge component of FIG. 3.

FIG. 6 illustrates a perspective cut-away view of an interior edge of the panel door 110. Detailed is one embodiment of a door leaf hinge component 300 of the leaf hinge assembly adapted to engage the offset-frame leaf hinge component 255 (FIG. 5) and pivotally secure one edge of the panel door 110 to the equipment cabinet 105. The door leaf hinge component 300 includes a leaf member 305 for mounting the door leaf hinge component 300 to an edge of the panel door 110. As shown, the leaf member 305 is mounted to a leaf mounting bracket 310 coupled to the interior door panel 225.

The leaf member 305 can be attached to the leaf mounting bracket 310 using any suitable fastening means including mechanical fasteners, such as screws, rivets, or chemical fastening means including welding or chemical bonding. Mechanical fasteners 315 are used for the illustrative embodiment. As some mechanical fasteners 315 may protrude as shown, they preferably align with the cutouts 285 in the offset-frame leaf (FIG. 5), thereby avoiding interference between the door leaf hinge component 300 and the offset-frame leaf hinge component 255 (FIG. 5) when in the closed position.

A cutout along the interior edge of the panel door 110 provides access to the door leaf hinge component 300. The cutout may be formed from portions of one or more of the inner panel 225, the outer panel 220, and the first vertical frame member 345a. The cutout defines top and bottom edges 325a, 325b that are spaced sufficiently apart to accept the offset-frame leaf hinge component 255 (FIG. 5) when the panel door 110 is mounted to the cabinet 105. Thus, the hinge 125 (FIG. 1) is hidden from view when the panel door 110 is closed. A cutout in the outer panel 220 extending between the top and bottom edges 325a, 325b defines an elongated edge 327. When the panel door 110 is fully open, the elongated edge 327 interferes with door stop surface 295 (FIG. 5) preventing further opening of the panel door.

In some embodiments, the door leaf hinge component 300 includes a top and bottom hinge pins 330a, 330b (generally 330) disposed along a pivot axis. The hinge pins 330 are positioned to pivotally engage apertures of the knuckles (275) of the offset-frame leaf hinge component 255. The hinge pins 330 can be spring loaded, such that they can be retracted into the door leaf hinge component 300 during installation and removal of the panel door 110 from the cabinet 105. Each of the hinge pins 330a, 330b (generally 330) can include a respective release pin 335a, 335b (generally 335) extending radially outward from the pivot axis. Each of the hinge pins 330 is slideable within a respective slot formed within the door leaf hinge component 300. Each slot includes a respective detent 340a, 340b (generally 340) into which the release pin 335 can be positioned, thereby temporarily retaining the hinge pin 330 in a retracted position. After the panel door 110 is aligned with the corresponding edge of the equipment cabinet 105, the release pin 335 is moved out of the detent 340 allowing the spring-loaded hinge pin 330 to extend into a portion of the knuckle 275 of the mating offset-frame leaf hinge component 255 (FIG. 5). In some embodiments, a commercially available door leaf hinge component 300 can be used. For example, the removable door leaf hinge component 300 can be a part number F6-940 door leaf, commercially available from Southco, Inc. of Concordville, Pa.

FIG. 7 illustrates a cross-sectional top view of a front portion of the equipment cabinet 105. Located on the right-hand side of the front portion of the cabinet 105 is the latch keeper 150. The latch keeper 150 is shown mounted to a right vertical cabinet frame member 120b providing rigid structural support thereto. Visible is a top horizontal surface 170' of the latch keeper 150 defining the aperture 175a. The aperture 175a resides at a distance $l_1$ away from the front surface of the cabinet 105 and is positioned to align with an axis of the latching rod end portion 230 (FIG. 4) when the panel door 110 (FIG. 1) is in the closed position.

Located on the left-hand side of the front portion of the cabinet 105 is the one portion of the leaf hinge assembly. The offset-frame leaf hinge component 255 is shown mounted to a left vertical cabinet frame member 120a providing rigid structural support thereto. Visible is an open end of the knuckle 275a revealing the pivot axis. The knuckle 275a (and thus the pivot axis) resides at a distance $1_2$ away from the front surface of the cabinet 105 and is positioned to align with the top hinge pin 330a of the door leaf hinge component 300 (FIG. 6), the panel door 110 (FIG. 1) pivoting between open and closed positions along the pivot axis.

FIG. 8 illustrates a cross-sectional top view of the panel door 110. The panel door 110 includes inner panel 225 and outer panel 220 joined together along each of a first and second vertical frame members 345a, 345b. Located adjacent to the right-hand edge of the inner panel 225 is an end portion of the latching rod 230. The latch guide 250 is shown mounted to the inner panel 225 providing rigid structural support thereto. The latch guide 250 maintains the end portion of the latching rod 230 along a latching axis positioned to align with the aperture 175a of the latch keeper 150 (FIG. 7) when the panel door 110 is in the closed position. As described above in reference to FIG. 4, the inner panel 225 includes a latch guide channel 235 positioned and dimensioned to accept at least a leading end 185 of the latch keeper 150 (FIG. 3) when the panel door 110 is in the closed position.

Located on the left-hand side of the panel door 110 is the door leaf hinge component 300 of the leaf hinge assembly. The door leaf hinge component 300 can be mounted to a door-leaf mounting bracket 310 provided within the inner panel 225. The door leaf hinge component 300 includes hinge pins 330 aligned along the hinge-pivot axis, such that the hinges pins 330 reside within the knuckles 275 of the offset frame member 255 (FIG. 7). FIG. 7 and FIG. 8 are positioned relative to each other to further illustrate the alignment of the panel door 110 to one surface of the equipment cabinet 105.

Figure 9A:
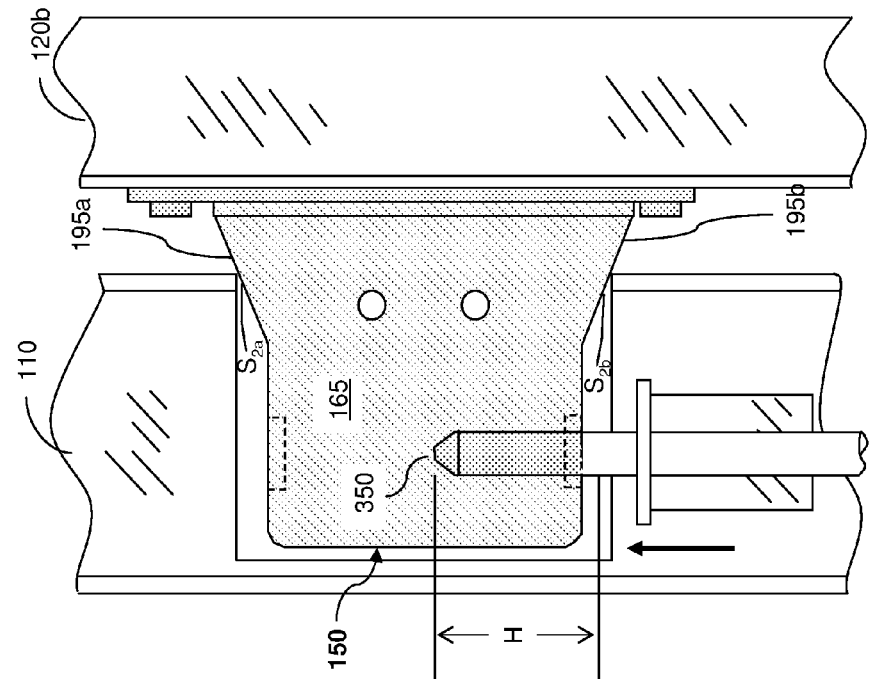
FIG. 9A illustrates a partial elevation view of the equipment enclosure door, approaching the equipment enclosure frame during closure, including the seismic-resistant latch keeper of FIG. 3, shown in an unlatched position.

FIG. 9A schematically illustrates engagement of the leading end 185 of the latch keeper 150 into the latch channel 235 of the panel door 110. The arrow indicates the direction of closing of the panel door 110. The latching rod end portion 230 is shown in an unlatched position, such that it is retracted below a bottom leading edge 240b of the channel aperture 235. This positioning ensures that the leading edge 185 of the latch keeper 150 will not interfere with the rod 230 when the panel door 110 is closed. The end portion of the latching rod 230 is retained along the latching axis by the latch guide 250.

The opening dimension of the channel 235 defined between the top and bottom leading edges 240a, 240b is sufficient to accept the leading edge 185 of the latch keeper 150 without interference. This condition can be met by maintaining a first minimum clearance $S_{1a}$ between the top of the latch fin 165 and the top leading edge 240a and a second minimum clearance $S_{2a}$ between the bottom of the latch fin 165 and the bottom leading edge 240b. The first and second clearances $S_{1a}$, $S_{2a}$ do not need to be equal.

Figure 9B:
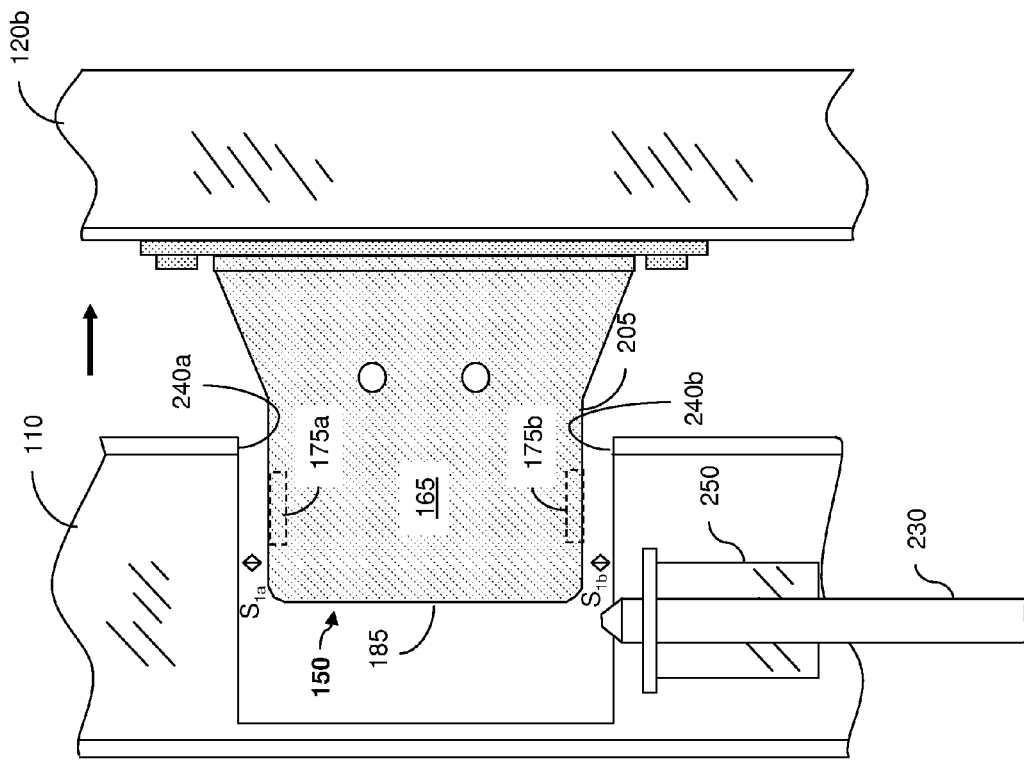
FIG. 9B illustrates a partial elevation view of the equipment enclosure door in a closed and latched position.

Referring next to FIG. 9B, the fin 165 is shown positioned within the latch channel 235 corresponding to a closed position of the panel door 110. When the fin 165 is so positioned, the latching rod end portion 230 is substantially aligned with the aperture 175b of the latch keeper 150. In some embodiments, the tip of the latching rod end portion 230 includes a taper 350 to bring the latching rod end portion 230 into alignment with the aperture as the latching rod end portion 230 is moved from the unlatched to the latched position. Thus, if there is a slight misalignment, the tapered tip 350 will adjust the relative position of the latch keeper 150 and the panel door 110, bringing them into alignment.

A linear distance 'H' measured between the latching rod end portion 230 in the latched and unlatched positions is referred to as the "throw." Depending upon the throw, at least a portion of the latching rod end portion 230 will reside within the aperture 175a of the latch keeper 150 forming an interference therebetween. The resulting interference prevents unwanted opening of the panel door 110 as long as the latch keeper 150 continues engaging the latching rod end portion 230.

As shown in more detail, the top and bottom tapers of the shoulder 195a, 195b result in a reduction in the clearance when the panel door 110 is closed between the respective top and bottom leading edges 240a, 240b. These clearances are illustrated as $S_{2a}$ and $S_{2b}$. Preferably, the taper causes the following expression to be satisfied:

$$S_{1a}+S_{1b}>S_{2a}+S_{2b} \qquad (1)$$

Beneficially, the reduced clearance between the latch keeper 150 and the panel door 110 minimizes the amount of play available therebetween. In a seismic event, distortion of the rack (FIG. 2) combined with a rigid rectangular door 110 will tend to produce vertical movement along the latching edge of the door 110. With a larger clearance (i.e., $S_{1a}+S_{1b}$), the movement results in the unwanted "jack hammering" of the top and bottom leading edges 240a, 240b against the top and bottom surfaces 170', 170" (FIG. 3) of the latch keeper 150. Sufficient jack hammering can lead to disengagement of the latching rod end portion 230 from the latch keeper 150 (particularly when a relative small throw is provided) and even to mechanical failure of the latch keeper 150. In either situation, the latching end of the panel door 110 can become disengaged from the latch keeper, despite it being in the latched position, leading to unwanted opening of the panel door 110. By reducing the clearance in the latched position (i.e., $S_{2a}+S_{2b}$), the jack hammering effect is reduced or eliminated. Thus, the panel door 110 remains latched to the equipment cabinet 105 throughout the seismic event.

In some embodiments, the clearance between the one or more of the top and bottom tapers 195a, 195b and the corresponding adjacent leading edge 240a, 240b is not more than about 0.020 inch. Additionally, one or more of the tapers 195a, 195b can also aid in bringing the panel door 110 into proper alignment upon closure.

Despite the latched portion of the panel door 110 remaining secured to the equipment cabinet 105 during a seismic event, there can be some deformation between the panel door 110 and the equipment cabinet 105. Beneficially, the design of the offset-frame leaf hinge component 255 is to deform during a seismic event, thereby allowing a closed panel door 110 to move relative to the equipment cabinet 105, without disengaging from the equipment cabinet 105. The offset pivot of the hinge component 255 moving with the edge of the panel door 110, while the frame leaf mounting bracket 260 (FIG. 5) remains attached to the left vertical frame member 120a can satisfy this condition. Distortion of the pivot axis relative to the left vertical frame member 120a is absorbed by a deformation of one or more of the knuckle support arms 270 and the pivot offset member 280 (FIG. 3). Thus, the offset-frame leaf hinge component 255 is preferably made from a ductile material, that is rigid enough to support the panel door 110 during normal operation, yet capable of plastic deformation under the stresses and strains resulting from a seismic event. The thickness of the offset-frame leaf hinge component 255 contributes to making the hinge deformable during the seismic event in order to absorb seismic energy. For this purpose, a suitable range of thicknesses is approximately 0.090 to 0.125 inches. When formed using the same or similar material, the combined thickness of the fin 165 and reinforcing plate 200 is generally larger than 0.125 inches to promote deformation of the leaf hinge component 255 before the latch keeper 150. For example, a combined thickness of the fin 165 material and the reinforcing plate 200 can be about 0.160 inch or more.

Figure 10:
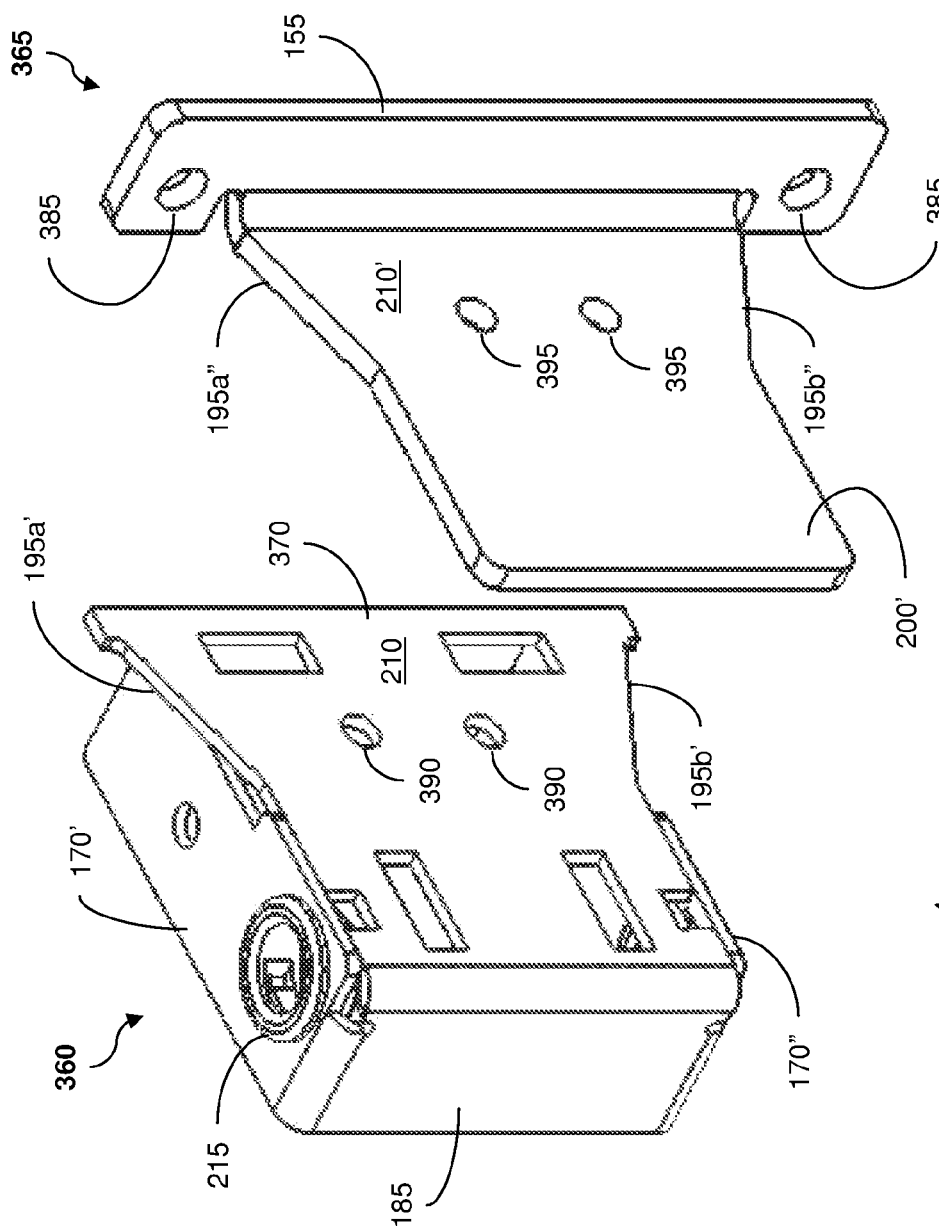
FIG. 10 illustrates an exploded perspective view of a two-piece embodiment of the seismic-resistant latch keeper of FIG. 3.

FIG. 10 illustrates an exploded perspective view of a two-piece embodiment of the seismic-resistant latch keeper 150. The latch keeper 150 includes a latch-keeper housing 360 coupled to a latch-keeper reinforcing member 365. The latch-keeper housing 360 includes the top and bottom horizontal surfaces 170', 170", a leading end 185, and a side wall 370. In some embodiments, the latch-keeper housing 360 can be stamped or cut from a single piece of sheet stock that can be bent into the configuration shown. The side wall can maintain the side profile of the latch keeper 150, also having a shoulder 210 with top and bottom tapers 195a', 195b'.

The reinforcing member 365 includes a reinforcing plate 200' that also maintains the side profile of the latch keeper 150, having a shoulder 210' with top and bottom tapers 195a", 195b". A mounting bracket 155 is attached at the shouldered end of the reinforcing plate 200'. The mounting bracket resides in a plane orthogonal to the reinforcing plate 200' and can include one or more mounting apertures 385.

The latch-keeper housing 360 is brought into alignment with the reinforcing plate 200', such that the side wall 370 abuts one side of the reinforcing plate 200'. Additionally, the top and bottom shoulders 195a', 195b' of the side wall 370 are brought into alignment with the top and bottom shoulders 195a", 195b" of the reinforcing plate 200'. In some embodiments, the latch keeper housing 360 includes one or more alignment holes 390 positioned for alignment with similar holes 395 provided in the reinforcement plate 200'. One or more pins can be inserted temporarily through the holes 395, 390 to hold the latch-keeper housing 360 into alignment with the reinforcing plate 200'. The two components 360, 365 can be attached together using mechanical fasteners, such as screws, rivets, or chemical fastening means including welding or chemical bonding.

While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A seismic-resistant latching system securing a door to a frame of a cabinet disposed on a horizontal supporting surface, the frame having a vertical frame member, the latching system comprising:

latching means disposed at an edge of one of the door and the vertical frame member, the latching means including a first vertical surface with an open section exposing a cavity behind the first vertical surface and a latching bolt coupled within the cavity for vertical movement therein between a latched position and an unlatched position; and a latch keeper extending substantially normal from a second vertical surface of the other of the door and the vertical frame member in position to enter the cavity when the door latches to the frame, the latch keeper including a fin with a vertical forward surface, opposing horizontal surfaces spatially separated by the forward surface, and opposing vertical side surfaces spatially separated by the forward surface, one of the horizontal surfaces having an aperture sized to receive the latching bolt, one of the vertical side surfaces having a tapered edge that extends beyond a plane of one of the horizontal surfaces to give the fin a vertical dimension that exceeds a corresponding vertical dimension of the cavity, the tapered edge preventing the fin from entering fully into the cavity by engaging the first vertical surface when the door latches to the frame and establishing a close fit by the latch keeper within the cavity to limit relative motion therebetween during a seismic event.

2. The seismic-resistant latching system of claim 1, wherein the latch keeper attaches to the vertical frame member and the latching means is disposed in the door.

3. The seismic-resistant latching system of claim 1, wherein the tapered edge is linear.

4. The seismic-resistant latching system of claim 1, wherein the tapered edge is curvilinear.

5. The seismic-resistant latching system of claim 1, wherein the tapered edge tapers in a vertical dimension with respect to the frame.

6. The seismic-resistant latching system of claim 2, wherein the latch keeper includes:

a reinforcing member having a reinforcing plate that attaches to the vertical side surface with the tapered edge and a mounting bracket extending orthogonally from the reinforcing plate for mounting to the vertical surface of the vertical frame member.

7. The seismic-resistant latching system of claim 1, further comprising at least one hinge coupling the door to the frame, each hinge having a thickness adapted to make the hinge deformable during the seismic event in order to absorb seismic energy.

8. The seismic-resistant latching system of claim 7, wherein the thickness ranges from approximately 0.090 to 0.125 inches.

9. The seismic-resistant latching system of claim 7, wherein the hinge is an offset hinge comprising a pivot offset member securely attached to the frame and separating a pivot axis from the frame by an offset height.

10. A seismic latch keeper assembly securing a door to a frame of a cabinet disposed on a horizontal supporting surface, the frame having a vertical frame member, the door having a first vertical surface with an open section exposing a cavity behind the first vertical surface and a slideable latching bolt coupled in the cavity for vertical movement therein between latched and unlatched positions, the latch keeper assembly comprising:

a fin having a distal end sized to enter the cavity with a first clearance, a proximal end opposite the distal end, opposing horizontal walls spatially separated by a forward wall at the distal end, and opposing vertical side walls spatially separated by the forward wall at the distal end, one of the horizontal walls having a bolt-receiving aperture sized to receive the latching bolt one of the vertical side walls including a portion having an expanding taper that extends beyond a plane of one of the horizontal surfaces to give the fin a vertical dimension that exceeds a corresponding vertical dimension of the cavity, the expanding taper preventing the fin from entering fully into the cavity by engaging the first vertical surface with a second clearance less than the first clearance when the distal end of the fin enters the cavity, the second clearance operating to limit relative movement of the fin within the cavity during a seismic event; and a mounting flange for coupling the fin to the vertical frame member.

11. The seismic-resistant latch keeper assembly of claim 10, wherein the expanding taper of the shoulder portion includes at least one sloping edge.

12. The seismic-resistant latch keeper assembly of claim 10, wherein the expanding taper is a first expanding taper, and the shoulder portion includes a second expanding taper that extends beyond a plane of one of the horizontal walls, the second expanding taper being on an edge of that one vertical side wall of the fin opposite an edge with the first expanding taper.

13. The seismic-resistant latch keeper assembly of claim 10, further comprising a reinforcing member coupled to the the one vertical side wall of the fin having the expanding taper.

14. An electronic enclosure cabinet comprising:
a door having a latching means disposed at one edge of the door, the latching means including a first vertical surface with an open section exposing a cavity behind the first vertical surface and a latching bolt coupled within the cavity for vertical movement therein between a latched position and an unlatched position; and
a frame having a vertical frame member and a latch keeper assembly extending substantially normal from a second vertical surface of the vertical frame member in position to enter the cavity when the door latches to the frame, the latch keeper assembly including a fin with a distal end sized to enter the cavity, a proximal end opposite the distal end, opposing horizontal surfaces spatially separated by a forward surface at the distal end, and opposing vertical side surfaces spatially separated by the forward surface at the distal end, one of the horizontal surfaces having an aperture sized to receive the latching bolt, one of the vertical side surfaces having a shoulder portion with a tapered edge that extends beyond a plane of one of the horizontal surfaces to give the fin a vertical dimension that exceeds a corresponding vertical dimension of the cavity, the tapered edge preventing the fin from entering fully into the cavity by engaging the first vertical surface when the distal end of the fin enters the cavity and establishing a close fit by the latch keeper assembly within the cavity to limit relative motion therebetween during a seismic event.

15. The electronic enclosure cabinet of claim 14, further comprising at least one hinge pivotally coupling the door to the frame, each hinge having a thickness designed to make the hinge deformable during the seismic event in order to absorb seismic energy.

16. The electronic enclosure cabinet of claim 15, wherein the thickness ranges from approximately 0.090 to 0.125 inches.

17. The electronic enclosure cabinet of claim 14, further comprising
a mounting flange for coupling the latch keeper assembly to the frame.

18. The electronic enclosure cabinet of claim 14, wherein the tapered edge is a first tapered edge, and the shoulder portion includes a second tapered edge that extends beyond a plane of one of the horizontal surfaces, the second tapered edge being opposite the first tapered edge.

* * * * *